US012609904B2

(12) United States Patent
Hai et al.

(10) Patent No.: US 12,609,904 B2
(45) Date of Patent: Apr. 21, 2026

(54) METHODS AND APPARATUSES FOR GROUP MESSAGE PROCESSING, SYSTEM, AND COMPUTER MEDIUM

(71) Applicant: Beijing Zitiao Network Technology Co., Ltd., Beijing (CN)

(72) Inventors: Kun Hai, Beijing (CN); Bokun Zhou, Beijing (CN); Ziang Zhang, Beijing (CN); Yizhe Yang, Beijing (CN); Yan Jiang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 119 days.

(21) Appl. No.: 18/575,059

(22) PCT Filed: Sep. 28, 2022

(86) PCT No.: PCT/CN2022/121989
§ 371 (c)(1),
(2) Date: Dec. 28, 2023

(87) PCT Pub. No.: WO2023/051572
PCT Pub. Date: Apr. 6, 2023

(65) Prior Publication Data
US 2024/0430218 A1     Dec. 26, 2024

(30) Foreign Application Priority Data

Sep. 30, 2021     (CN) .......................... 202111165885.7

(51) Int. Cl.
*G06F 15/16*          (2006.01)
*H04L 51/04*          (2022.01)
*H04L 51/42*          (2022.01)

(52) U.S. Cl.
CPC .............. *H04L 51/04* (2013.01); *H04L 51/42* (2022.05)

(58) Field of Classification Search
CPC ....... H04L 51/04; H04L 51/42; H04L 51/043; G06Q 50/01
See application file for complete search history.

(56) References Cited

U.S. PATENT DOCUMENTS

| | | | |
|---|---|---|---|
| 5,923,733 | A | 7/1999 | Binns et al. |
| 2009/0067593 | A1 | 3/2009 | Ahlin |

(Continued)

FOREIGN PATENT DOCUMENTS

| | | |
|---|---|---|
| CA | 2206383 A1 | 12/1997 |
| CN | 101188578 A | 5/2008 |

(Continued)

OTHER PUBLICATIONS

Wendi et al., "Discrete-Event Simulation-Engine Technology Based on Mailbox-mechanism in C4ISR System", Journal of System Simulation, vol. 27, No. 9, Sep. 8, 2015, 6 pages, with English Abstract.

(Continued)

*Primary Examiner* — John B Walsh
(74) *Attorney, Agent, or Firm* — Astute IP Law Group

(57) ABSTRACT

Embodiments of the present disclosure relate to methods and apparatuses for group message processing, system, and computer medium. In least one of the embodiments of the present disclosure, for a supersized group, i.e., a group with a number of members exceeding a predetermined number, a server creates a group inbox corresponding to the supersized group. After obtaining messages for the supersized group, instead of directly sending message events to the personal inboxes for respective members of the supersized group in a "write diffusion" mode, the message events are stored in (Continued)

a group inbox of the supersized group. So that when a user activates a client, the message events are obtained from the group inbox by the client, which achieves a "read diffusion" mode. As compared with the "write diffusion" mode, the "read diffusion" mode can reduce the resource consumption by the server, and improve the system stability.

16 Claims, 4 Drawing Sheets

(56)                References Cited

U.S. PATENT DOCUMENTS

| 2011/0010638 A1* | 1/2011 | Fox | G06F 16/489 |
| | | | 715/752 |
| 2014/0369251 A1* | 12/2014 | Zhang | H04L 12/1877 |
| | | | 370/312 |
| 2015/0370885 A1 | 12/2015 | Kushmerick et al. | |
| 2018/0083905 A1 | 3/2018 | Jayaram et al. | |
| 2021/0044559 A1 | 2/2021 | Jain et al. | |

FOREIGN PATENT DOCUMENTS

| CN | 102137045 A | 7/2011 | |
| CN | 104935502 A | 9/2015 | |
| CN | 105282013 A | 1/2016 | |
| CN | 105991406 A | 10/2016 | |
| CN | 106357503 A | 1/2017 | |
| CN | 108111398 A | 6/2018 | |
| CN | 109600240 A * | 4/2019 | ............ H04L 51/04 |
| CN | 110798398 A | 2/2020 | |
| CN | 111352746 A | 6/2020 | |
| CN | 113923181 A | 1/2022 | |

OTHER PUBLICATIONS

Du et al., "XMPP Protocol and Its Application of in IM System Group Communication", Journal of Hunan Institute of Engineering. vol. 18, No. 3, Sep. 15, 2008, 5 pages, with English Abstract.
Notification to Grant Patent Right for Invention for Chinese Patent Application No. 202111165885.7, mailed on Jul. 28, 2023, 6 pages.
Rana et al., "An Enterprise Instant Messaging (EIM) Solution to Cater Issues Associated with Instant Messaging (IM) in Business", 2015 IEEE Student Conference on Research and Development (SCOReD), Apr. 9, 2016, 6 pages.
International Search Report and Written Opinion, International Patent Application No. PCT/CN2022/121989, Dec. 21, 2022, with English translation of Search Report, (14 pages).
Office Action issued in Chinese Patent Application No. 202111165885.7, Oct. 21, 2022, with machine translation (15 pages).

* cited by examiner

METHODS AND APPARATUSES FOR GROUP MESSAGE PROCESSING, SYSTEM, AND COMPUTER MEDIUM

CROSS-REFERENCE OF RELATED APPLICATION(S)

The present application is based on and claims priority to Chinese Patent Application No. 202111165885.7, filed on Sep. 30, 2021 and entitled "METHODS AND APPARATUSES FOR GROUP MESSAGE PROCESSING, SYSTEM, AND COMPUTER MEDIUM", the entirety of which is incorporated herein by reference.

FIELD

Embodiments of the present disclosure relates to the field of instant messaging, particularly to methods and apparatuses for group message processing, a system and a storage medium.

BACKGROUND

Instant Messaging (IM) allows two or more people to communicate in real time over the network. In the IM client, a group is a container that integrates multiple users, and a feed is a container that aggregates different groups, individual chat sessions, etc. When a user sends a message in a group, it is expected that each member of the group can see new messages in their feed list.

At present, the IM server is configured with a personal inbox for each user. When a user sends a message in a group, the message is processed through the "write diffusion" mode, where the "write diffusion" mode is: the IM server needs to send a message event to the personal inbox of each member in the group, so that the IM client obtains the message event from the user's personal inbox, and then obtains the message corresponding to the message event and presents the message in the group.

However, in the "write diffusion" mode, a message event needs to be sent to the personal inbox of each member in the group. In the scenario of a supersized group, that is, when the number of members in the group exceeds a predetermined number (such as 5000 people, 10000 people, etc.), the resource consumption by the IM server of the supersized group will be greatly increased, and the stability and performance of the IM system (including IM server and IM client) will also be affected.

SUMMARY

In order to solve at least one of the problem in the prior art, at least one of the embodiments of the present disclosure provides methods and apparatuses for group message processing, a system and a storage medium.

In a first aspect, embodiments of the present disclosure provide a method for group message processing. The method is applied at a server for creating a corresponding group inbox for a group with a number of members exceeding a predetermined number, the method comprising:

obtaining a message sent to a target group;

detecting whether the target group is a group with a number of members exceeding the predetermined number;

in accordance with a detection that the number of members of the target group exceeds the predetermined number, generating a message event based on the message;

storing the message into a database and storing the message event into a group inbox of the target group.

In some embodiments, the method for group message processing further comprises:

in accordance with a detection that the number of members of the target group does not exceed the predetermined number, generating a message event based on the message;

storing the message into the database and storing the message event to personal inboxes of respective members in the target group.

In some embodiments, the method for group message processing further comprises:

obtaining sorting interference from a user for a group with a number of members exceeding the predetermined number, to generate a group sorting event;

storing the group sorting event into a personal inbox of the user.

In a second aspect, embodiments of the present disclosure provide a method for group message processing. The method is applied at a client and comprises:

in response to an operation of activating the client, obtaining a list of groups with a number of members exceeding a predetermined number, a user of the client being comprised in the groups;

obtaining a set of message events from a group inbox corresponding to a group with a number of members exceeding the predetermined number, the set of message events comprising at least one message event;

presenting, based on the set of message events, a corresponding message through the client.

In some embodiments, the method for group message processing further comprises:

obtaining a set of group sort events from a personal inbox of the user, the set of group sorting events being an empty set or comprising at least one group sorting event;

presenting the corresponding message through the client comprises: presenting the corresponding message through the client based on the set of message events and the set of group sorting events.

In some embodiments, presenting the corresponding message through the client based on the set of message events and the set of group sorting events comprises:

combining the set of message events with the set of group sorting events, to obtain a set of target message events.

presenting, based on the set of target message events, the corresponding message through the client.

In some embodiments, any message event in the set of message events comprises: a first group identification, a first update time, and first description information; any group sorting event in the set of group sorting events comprises: user identification, a second group identification, a second update time, and second description information.

In some embodiments, combining the set of message events with the set of group sorting events comprises:

for any message event in the set of message events and for any group sorting event in the set of group sorting events, in accordance with a determination that the first group identification is the same as the second group identification, and the first update time is later than or the same as the second update time, generating a target message event, the target message event comprising the user identification, the first group identification, the first update time, and the first description information.

In some embodiments, combining the set of message events with the set of group sorting events comprises:

for any message event in the set of message events and any group sorting event in the set of group sorting events, in accordance with a determination that the first group identification is the same as the second group identification and the first update time is earlier than the second update time, generating a target message event to be the group sorting event, and establishing a correspondence relationship between the group sorting event and the message event.

In some embodiments, the set of target message events comprises at least one of the group sorting events;

presenting, based on the set of target message events, a corresponding message through the client comprises:

determining, based on the second update time in a group sorting event, sorting of the second group identification in the list, and presenting the sorting through the client;

searching, based on the correspondence relationship, for a message event corresponding to the group sorting event in the set of message events, and retrieving a corresponding message from the database based on the first description information in the message event, and presenting, through the client, the message in the group corresponding to the second group identification in the group sorting event.

In a third aspect, embodiments of the present disclosure further provide an apparatus for group message processing, the apparatus being applied at a server for creating a corresponding group inbox for a group with a number of members exceeding a predetermined number, the apparatus comprising:

an obtaining module configured to obtain a message sent to a target group;

a detecting module configured to detect whether the target group is a group with a number of members exceeding the predetermined number;

a generating module configured to, in accordance with a detection that the number of members of the target group exceeds the predetermined number, generate a message event based on the message;

a storing module configured to store the message into a database and store the message event into a group inbox of the target group.

In a fourth aspect, embodiments of the present disclosure further provide an apparatus for group message processing, the apparatus being applied at a client and comprising:

a first obtaining module configured to, in response to an operation of activating the client, a list of groups with a number of members exceeding a predetermined number, a user of the client being comprised in the groups;

a second obtaining module configured to obtain a set of message events from a group inbox corresponding to a group with a number of members exceeding the predetermined number, the set of message events comprising at least one message event;

a presenting module configured to present, based on the set of message events, a corresponding message through the client.

In a fifth aspect, embodiments of the present disclosure further provide a system comprising at least one computing device and at least one storage device storing instructions, wherein the instructions, when executed by the at least one computing device, cause the at least one computing device to perform the method for group message processing according to any embodiments of the first aspect or the method for group message processing according to any embodiments of the second aspect.

In a sixth aspect, embodiments of the present disclosure further provide a computer-readable storage medium, wherein the computer-readable storage medium stores a program or instructions that, when executed by at least one computing device, cause the at least one computing device to perform the method for group message processing according to any embodiments of the first aspect or the method for group message processing according to any embodiments of the second aspect.

Accordingly, in at least one of the embodiments of the present disclosure, for a supersized group, i.e., a group with a number of members exceeding a predetermined number, a server creates a group inbox corresponding to the supersized group. After obtaining messages for the supersized group, instead of directly sending message events to the personal inboxes for respective members of the supersized group in a "write diffusion" mode, the message events are stored in a group inbox of the supersized group. So that when a user activates a client, the message events are obtained from the group inbox by the client, which achieves a "read diffusion" mode. As compared with the "write diffusion" mode, the "read diffusion" mode can reduce the resource consumption by the server, and improve the system stability (for both the server and the clients).

BRIEF DESCRIPTION OF THE DRAWINGS

To illustrate the technical solutions of embodiments of the present disclosure more apparently, the brief description will be made with reference to the accompanying drawings or the prior art to be used. Obviously, the following description of the drawings are only some embodiments of the present disclosure, and those ordinary skilled in the art will envisage other drawings based on these drawings.

DETAILED DESCRIPTION

To better understand the above objects, features and advantages of the present disclosure, the present disclosure will be further described in detail below in combination with the accompanying drawings and embodiments. It can be understood that the described embodiments are part of the embodiments of the present disclosure, not all embodiments. The specific embodiments described herein are only used to illustrate the present disclosure, not to limit it. According to the described embodiments of the present disclosure, all other embodiments obtained by those ordinary skilled in the art are within the scope of protection of the present disclosure.

It should be noted that in this description, relational terms such as "first" and "second" are only used to distinguish one entity or operation from another entity or operation, and do not necessarily require or imply any actual relationship or order between these entities or operations.

Figure 1:
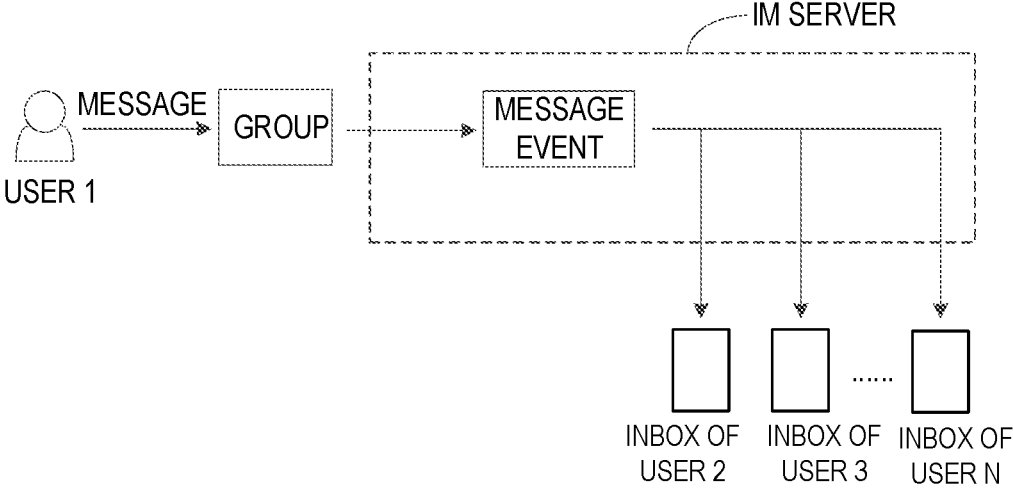
FIG. 1 is a schematic diagram of a scenario for processing messages in the "write diffusion" mode.

FIG. 1 is a schematic diagram of a scenario for processing messages in the "write diffusion" mode. In FIG. 1, the IM server configures a personal inbox for each user. After User 1 in a group sends a message to the group, the IM server generates an event message for this event, which includes at least a message identifier (message ID). Furthermore, the IM server processes this message in a "write diffusion" mode. Specifically, the IM server obtains all members of the group (referred to as User 2, User 3, . . . , User N), and then sends the message event to the personal inboxes of all the members in the group. As a result, an IM client obtains the message event from a personal inbox of a user, obtains the message corresponding to the message event, and presents the message in the group.

It can be seen that whenever a user sends a message or sends a message and @all members in the group, the "write diffusion" mode requires sending message events to the personal inboxes of respective members in the group. In the scenario related to a supersized group, that is, when the number of members in the group exceeds a predetermined number, the resource consumption by the IM server by the supersized group will be greatly increased, and it will also affect the stability and performance of the IM system (including an IM server and an IM client(s)).

To this end, embodiments of the present disclosure provides methods and apparatuses for group message processing, a system, and a storage medium, for a supersized group, i.e., a group with a number of members exceeding a predetermined number, an IM server creates a group inbox corresponding to the supersized group. After the IM server obtains messages for the supersized group, instead of directly sending message events to the personal inboxes for respective members of the supersized group in a "write diffusion" mode, the IM server stores message events in a group inbox of the supersized group. So that when a user activates an IM client, the IM clients message obtains message events from the group inbox, which achieves a "read diffusion" mode. As compared with the current "write diffusion" mode, the "read diffusion" mode can reduce the resource consumption by the server, and improve the system stability (for both the IM server and the IM clients).

Figure 2:
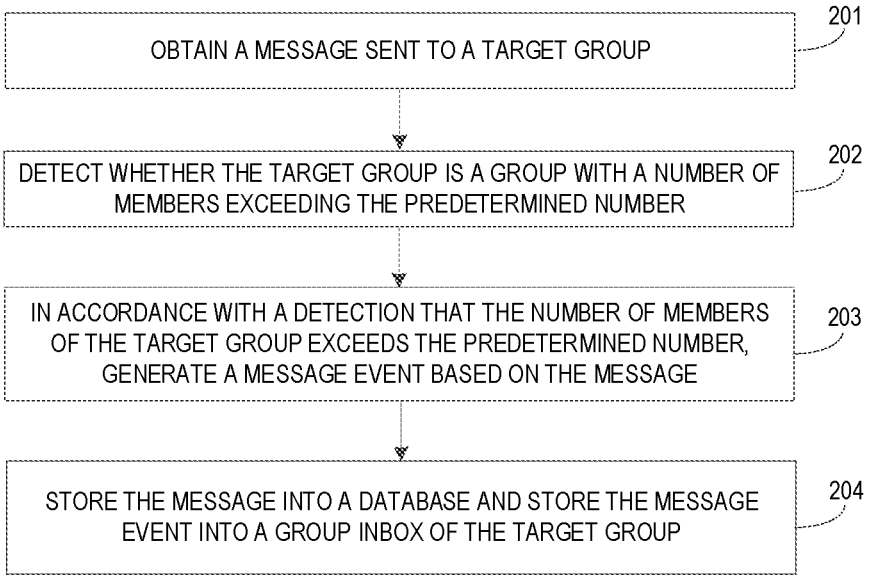
FIG. 2 is an example flowchart of a method for grouping message processing provided in embodiments of the present disclosure.

FIG. 2 is an example flowchart of a method for group message processing provided by embodiments of the present disclosure. The actor of this method for group message processing is a server, such as an IM server. The IM server creates a corresponding group inbox for a group with a number of members exceeding a predetermined number (i.e., a supersized group). The method for group message processing may include but is not limited to the following steps 201 to 204:

At step 201, obtain the message sent to the target group.

Any member of the target group can send messages to the target group. Specifically, after a user activates the IM client, a messages is sent to the target group through the IM client. The ways for the user to activate the IM client include: the user opening the IM client or the IM client running in the foreground from the background.

At step 202, detect whether the target group is a group with a number of members exceeding the predetermined number.

After the IM server obtains a message sent to the target group, it may obtain member information of the target group, which includes but is not limited to, the number of members, the member IDs of the respective members, and the like. Furthermore, the IM server can determine whether the target group is a supersized group. Specifically, the IM server determines whether the number of members of the target group exceeds a predetermined number. If it does, the IM server determines that the target group is a supersized group; otherwise, it determines that the target group is a normal group.

If the IM server determines that the target group is a supersized group, steps 203 and 204 are performed.

At step 203, in accordance with a detection that the number of members of the target group exceeds a predetermined number, generate a message event based on the message.

The IM server generates a message event based on the message sent to the target group, where the message event includes multi-field information, which includes but is not limited to, a first group identification (group ID), a first update time, first description information, and the like. The first update time is timestamp information when the user sends the message to the target group; the first description information includes but is not limited to a message identification (message ID), and/or a user identification (User ID) of the user sending the message.

At step 204, store the message into a database, and store the message event into a group box of the target group.

After generating the message event, the IM server stores the corresponding message into the database to ensure that the message will not be lost. In some embodiments, the IM server can store the message directly into the database after obtaining the message sent to the target group to ensure that the message will not be lost.

After generating the message event, the IM server stores the message event in the group inbox of the target group to ensure that the event will not be lost.

It can be seen that for a supersized group, that is, a group with a number of members exceeding the predetermined number, the IM server creates a group inbox corresponding to the supersized group. After obtaining a message of the supersized group, instead of directly sending a message event to the personal inbox of each member in the supersized group using the "write diffusion" mode, the IM server stores the message event in the group inbox of the supersized group so that when a user activates the IM client, the IM client can obtains the message event from the group inbox, which can achieve a "read diffusion" mode. Compared with the current "write diffusion" mode, the "read diffusion" mode can reduce the resource consumption by the IM server and improve the system stability (for both the IM server and the IM client).

In some embodiments, if the IM server determines that the target group is a common group, i.e., the IM server detects that the number of members of the target group does not exceed a predetermined number, the IM server generates a message event based on the message sent to the target group. The message event includes multi-field information, multi-field information, for example, including but not limited to, a first group identification (group ID), a first update time and a first description information.

After generating the message event, the IM server stores the message event corresponding to the message in the database to ensure that the message will not be lost.

After generating the message event, the IM server stores the message event in the personal inboxes of the respective members of the target group to ensure that the event will not be lost.

It can be seen that for normal groups, the "write diffusion" mode is still leveraged by the IM server to process the messages of normal groups.

In some embodiments, the method for grouping message processing shown in FIG. 2 may further include the following steps 205 and 206 which are not shown in FIG. 2:

At step 205, obtain sorting interference from a user for a group with a number of members exceeding the predetermined number (i.e., a supersized group), to generate a group sorting event sorting interference.

Herein, the sorting interference may be, for example, that if a user retrieves a group in the Feed list of the IM client or directly accesses a group in the Feed list, the sorting interference is generated for the group, and the IM client will pin this group in the Feed list.

Herein, the group sorting event includes multi-field information, including but not limited to, a user identification (User ID), a second group identification (Group ID), a second update time, and second description information. The user identification is the identification of the user who performs sorting interference on the supersized group; the second update time is the timestamp information of the sorting interference by the user on the supersized group; and the second description information includes, but is not limited to, a message identification (message ID). In some embodiments, the message identification included in the second description information is empty.

At step 206, store the group sorting event into a personal inbox of the user.

After the IM server generates a group sorting event for a supersized group, it does not store the group sorting event in the group inbox of the supersized group, but stores the group sorting event in the user's personal inbox, where the user performs sorting interference on the supersized group.

The IM server can also store the user's individual chat data directly to the user's personal inbox. Therefore, the user's personal inbox can store message events for normal groups, group sorting events for supersized groups, and the user's individual chat data.

Figure 3:
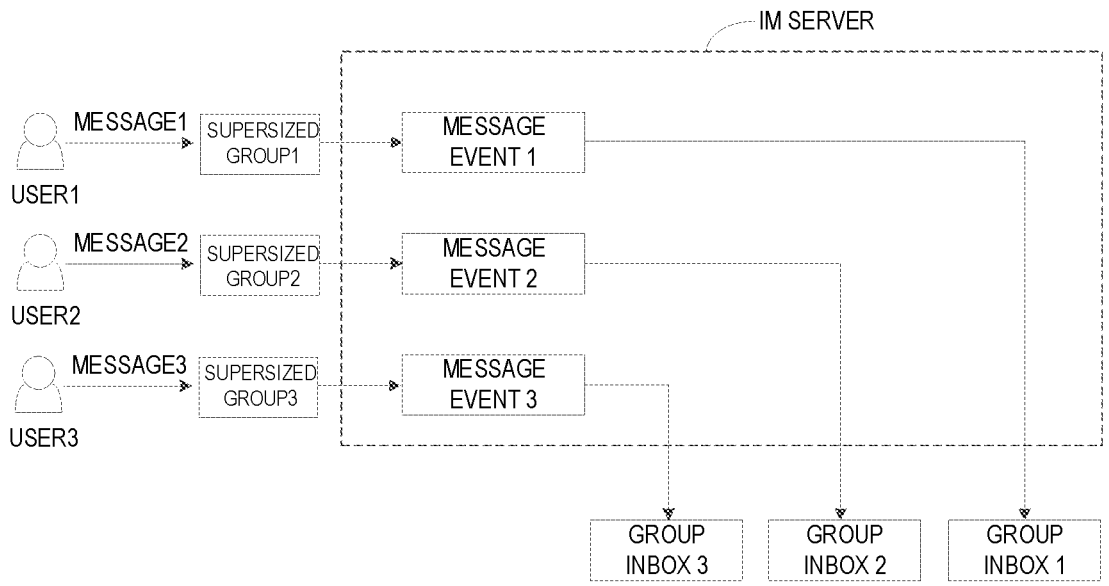
FIG. 3 is a schematic diagram of a scenario of an IM server processing supersized group messages provided in embodiments of the present disclosure.

On the basis of the method for group message processing disclosed in the above embodiments, FIG. 3 is a schematic diagram of a scenario where an IM server processes a supersized group message provided by the embodiments of the present disclosure. The IM server creates a corresponding group inbox for a group with a number of members exceeding the predetermined number (i.e., a supersized group). In FIG. 3, the IM server creates Group Inbox 1 for Supersized Group 1, Group Inbox 2 for Supersized Group 2, and Group Inbox 3 for Supersized Group 3.

In FIG. 3, User 1 sends Message 1 to Supersized Group 1. The IM server obtains Message 1 and generates Message Event 1 based on Message 1. After generating Message Event 1, the IM server stores Message 1 into the database and stores Message Event 1 into Group Inbox 1.

In FIG. 3, User 2 sends Message 2 to Supersized Group 2. The IM server obtains the Message 2 and generates Message Event 2 based on Message 2. After generating Message Event 2, the IM server stores Message 2 into the database and stores Message Event 2 into Group Inbox 2.

In FIG. 3, User 3 sends Message 3 to Supersized Group 3. The IM server obtains Message 3 and generates Message Event 3 based on Message 3. After generating message event 3, the IM server stores Message 3 in the database and stores Message Event 3 into Group Inbox 3.

It can be seen that for a supersized group, that is, a group with a number of members exceeding a predetermined number, the IM server creates a group inbox corresponding to the supersized group. After obtaining a message for the supersized group, the IM server does not directly send the message event to the personal inboxes of respective members in the supersized group using the "write diffusion" mode, but stores a message event in the group inbox of the supersized group so that when the user activates the IM client, the IM client can obtain the message event from the group inbox, resulting in a "read diffusion" mode. Compared with the current "write diffusion" mode, the "read diffusion" mode can reduce the resource consumption by the IM server and improve the system stability (for both the IM server and the IM client).

Figure 4:
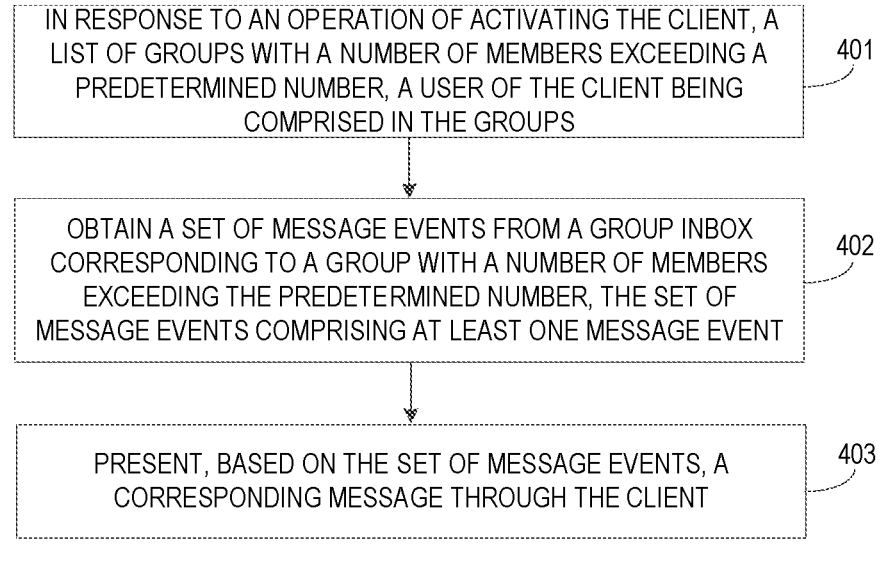
FIG. 4 is an example flowchart of a further group message processing method provided in embodiments of the present disclosure.

FIG. 4 is an example flowchart of a further method for group message processing provided by embodiments of the present disclosure. The actor of this method for group message processing is a client, such as an IM client. The method for group message processing may include but is not limited to the following steps 401 to 403:

At step 401, in response to an operation of the client, obtain a list of groups with a number of members exceeding a predetermined number, a user of the client being comprised in the groups.

The ways for the user to activate the IM client include opening the IM client or the IM client running in the foreground from the background. In response to the activation operation, the IM client can obtain a list of groups with a number of members exceeding the predetermined number (i.e., supersized groups) where the user of the IM client is comprised.

At step 402, obtain a set of message events from a group inbox corresponding to a group with a number of members exceeding the predetermined number, the set of message events comprising at least one message event.

Herein, the set of message events includes at least one message event. The set of group sorting events is an empty set or includes at least one group sorting event.

In addition to obtaining the group sorting events from the user's personal inbox, the IM client can also obtain the set of message events for normal groups and the user's individual chat data.

At step 403, present, based on the set of message events, a corresponding message through the client.

It can be seen that when the user activates the IM client, the IM client obtains the message events of the supersized group from the group inbox. As long as the user does not activate the IM client, the IM client will not actively obtain the message events of the supersized group, achieving the "read diffusion" mode of the IM client. Compared with the current IM server "write diffusion" mode, the "read diffusion" mode can reduce the resource consumption by the IM server and improve the system stability (for both the IM server and the IM client).

It should be noted that if the IM client has been in an active state, for example, the user has been using the IM client, then when the group inbox or the user's personal inbox has a new event, the IM client will pull the new event and present the corresponding message.

In some embodiments, step 402 further comprises: obtaining a set of group sort events from a personal inbox of the user, the set of group sorting events being an empty set or comprising at least one group sorting event.

In some embodiments, step 403 of presenting the corresponding message through the client comprises: presenting the corresponding message through the client based on the set of message events and the set of group sorting events.

In some embodiments, step 403 of presenting the corresponding message through the client based on the set of message events and the set of group sorting events may include the following steps 4031 and 4032:

4031. Combine the set of message events with the set of group sorting events, to obtain a set of target message events.

Herein, any message event in the set of message events includes multi-field information, including but not limited to, a first group identification (group ID), a first update time, and first description information. The first update time is the timestamp information when the user sends the message to the target group; the first description information includes but is not limited to a message identification (message ID) and/or a user identification (User ID) for sending the message.

Herein, the group sorting event includes multi-field information, including but not limited to, a user identification (User ID), a second group identification (Group ID), a second update time, and second description information. The user identification is the identification of the user who performs sorting interference on the supersized group; the second update time is the timestamp information of the sorting interference of the user on the supersized group; and the second description information includes but is not limited to a message identification (message ID). In some embodiments, the message identification included in the second description information is empty.

The ways of the IM client combines the set of message events with the group sorting event collection may include the following two solution:

Solution 1: for any message event in the set of message events and for any group sorting event in the set of group sorting events, if the first group identification is the same as the second group identification, and the first update time is later than or the same as the second update time, a target message event is generated to comprise the user identification, the first group identification, the first update time, and the first description information.

Solution 2: for any message event in the set of message events and any group sorting event in the set of group sorting events, if the first group identification is the same as the second group identification and the first update time is earlier than the second update time, a target message event is generated to be the group sorting event, and a correspondence relationship between the group sorting event and the message event is established.

For example, the data format of a message event is: chatCA: update_time_v1: data1. Herein, chatCA is the supersized group identification: update_time_v1 is the first update time; data1 is the first description information. The data format of a group sorting event is: userUA: chatCA: update_time_v2: data2. Herein, userUA is a user identification in the supersized group chatCA; update_time_v2 is the second update time; data2 is the second description information.

Regarding the above message event and group sorting event, since the first group identification of the message event is the same as the second group identification of the group sorting event (i.e., both are chatCA), the IM client combines the above message event and group sorting event according to Solution 1, as follows:

If the update_time_v1≥update_time_v2, i.e., the first update time is later than or the same as the second update time, the data format of the generated target message event is: userUA: chatCA: update_time_v1: data1.

Regarding the above message event and group sorting event, since the first group identification of the message event is the same as the second group identification of the group sorting event (i.e., both are chatCA), the IM client combines the above message events and group sorting event according to Solution 2, as follows:

If update_time_v1≤update_time_v2, that is, the first update time is earlier than the second update time, the data format of the generated target message event is: userUA: chatCA: update_time_v2: data2. In addition, link information can be added to data2, which points to the message event to establish a correspondence relationship between the group sorting event and the message event.

It can be seen that by combining the set of message events with the group sorting event collection in the above two ways, a set of target message events can be obtained. The IM client only needs to process the set of target message events, without processing each message event and each group sorting event separately, which improves the processing efficiency.

4032. Present based on a set of target message events, the corresponding message through the client.

If the set of target message events includes at least one of the group sorting events, the IM client can determine, based on the second update time in a group sorting event, sorting of the second group identification in the list, and present the sorting through the client. Moreover, the IM client can search, based on the correspondence relationship, for a message event corresponding to the group sorting event in the set of message events, and retrieve a corresponding message from the database based on the first description information in the message event. The IM client presents the message in the group corresponding to the second group identification in the group sorting event.

For example, according to Solution 2, the IM client may determine, based on "update_time_v2" in the group sorting event, the sorting of "chatCA" in the group sorting event in the list of supersized groups. The IM client presents the sorting. The IM client may jump, based on the link information of data2 in the group sorting event, to the message event corresponding to the link information, and obtain, based on the message event "data1", the corresponding message from the database. The IM client presents the message in the group corresponding to the group sorting event chatCA.

Figure 5:
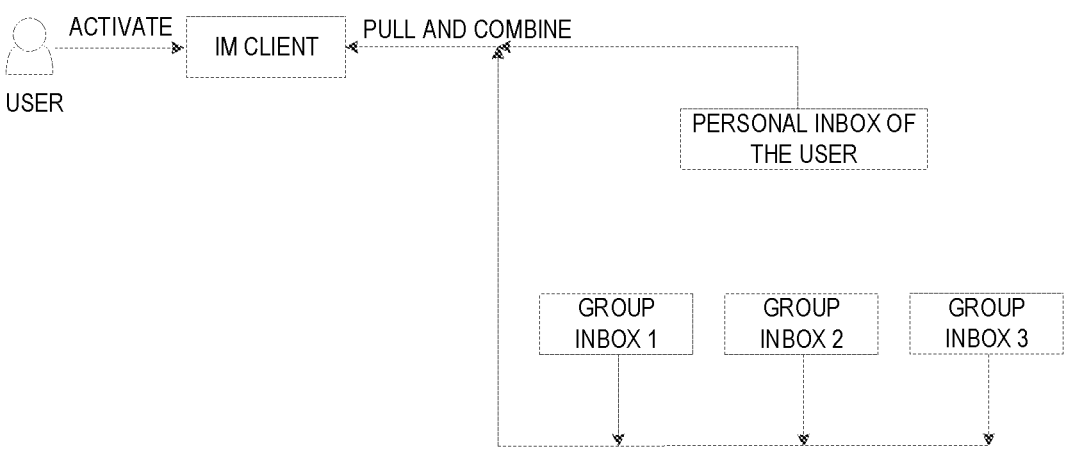
FIG. 5 is a schematic diagram of a scenario of an IM client processing supersized group messages provided in embodiments of the present disclosure.

FIG. 5 is a schematic diagram of a scenario where an IM server processes supersized group messages provided by embodiments of the present disclosure. In FIG. 5, the user activates the IM client by opening the IM client or the IM client entering the foreground from the background. The IM client pulls the set of message events from a group inbox corresponding to a group with a number of members exceeding the predetermined number (i.e., a supersized group). For example, if the user is included in three supersized groups, the group inboxes of these three supersized groups are referred to as Group Inbox 1, Group Inbox 2, and Group Inbox 3. The IM client pulls the set of message events from Group Inbox 1, Group Inbox 2, and Group Inbox 3, and pulls a sets of group sorting event from the user's personal inbox.

In FIG. 5, after the IM client pulls the set of message events in Group Inbox 1, Group Inbox 2, and Group Inbox 3, as well as the set of group sorting events in the user's personal inbox, the IM client combines the set of message events with the set of group sorting events to obtain the set of target message events, and then presents the corresponding messages through the client based on the set of target message events.

It should be noted that the above-mentioned method embodiments are all described as a series of action combinations for simplicity. However, those skilled in the art can understand that the embodiments of the present disclosure are not limited by the action sequence described, as some steps can be performed in other sequences or simultaneously according to the embodiments of the present disclosure. In addition, those skilled in the art can understand that the embodiments described in the specification are all optional embodiments.

Figure 6:
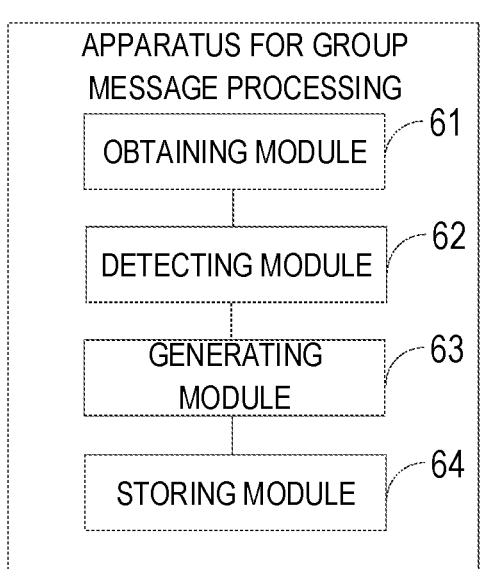
FIG. 6 is an example block diagram of an apparatus for grouping message processing provided in embodiments of the present disclosure.

FIG. 6 shows an apparatus for group message processing provided by embodiments of the present disclosure, which is applied at a server, such as an IM server. The IM server creates a corresponding group inbox for a group with a number of members exceeding a predetermined number. The apparatus for group message processing includes but is not limited to:

An obtaining module 61 configured to obtain a message sent to a target group.

A detecting module 62 configured to detect whether the target group is a group with a number of members exceeding the predetermined number.

A generating module 63 configured to, in accordance with a determination that the number of members of the target group exceeds a predetermined number, generate a message event based on the message.

A storing module 64 configured to store the message into the database, and store the message event in the target group inbox.

In some embodiments, the generating module 63 is further configured to generate a message event based on the message when the detecting module 62 detects that the number of members of the target group does not exceed a predetermined number. The storing module 64 is further configured to store the message into the database and storing the message event to personal inboxes of respective members in the target group.

In some embodiments, the generating module 63 is further configured to obtain sorting interference from a user for a group with a number of members exceeding the predetermined number, to generate a group sorting event. The storing module 64 is further configured to store the group sorting event into a personal inbox of the user.

Technical details of the apparatus for group message processing disclosed in related embodiments of FIG. 6 may refer to the method for group message processing disclosed in related embodiments of FIG. 2, which will not be repeated here to avoid duplication.

Figure 7:
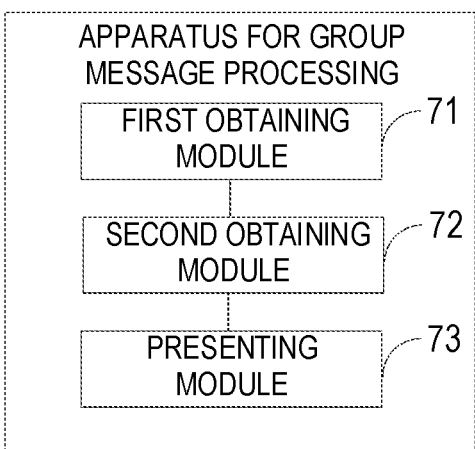
FIG. 7 is an example block diagram of a further apparatus for group message processing provided in embodiments of the present disclosure.

FIG. 7 shows an apparatus for group message processing provided by embodiments of the present disclosure, which is applied at a client, such as an IM client. The apparatus for group message processing includes but is not limited to:

A first obtaining module 71 configured to, in response to an operation of activating the client, obtain a list of groups with a number of members exceeding a predetermined number, a user of the client being comprised in the group.

A second obtaining module 72 configured to obtain a set of message events from a group inbox corresponding to a group with a number of members exceeding the predetermined number, the set of message events comprising at least one message event.

A presenting module 73 configured to present, based on the set of message events, a corresponding message through the client.

In some embodiments, the second obtaining module 72 is further configured to:

obtain a set of group sort events from a personal inbox of the user, the set of group sorting events being an empty set or comprising at least one group sorting event.

The presenting module 73 is further configured to:

present the corresponding message through the client comprises: presenting the corresponding message through the client based on the set of message events and the set of group sorting events.

In some embodiments, the presenting module 73 is further configured to: combine the set of message events with the set of group sorting events, to obtain a set of target message events; present, based on the set of target message events, the corresponding message through the client.

In some embodiments, any message event in the set of message events comprises: a first group identification, a first update time, and first description information; any group sorting event in the set of group sorting events comprises: user identification, a second group identification, a second update time, and second description information.

In some embodiments, the presenting module 73 combining a set of message events with a set of group sorting events comprises:

for any message event in the set of message events and for any group sorting event in the set of group sorting events, in accordance with a determination that the first group identification is the same as the second group identification, and the first update time is later than or the same as the second update time, the presenting module 73 generating a target message event, the target message event comprising the user identification, the first group identification, the first update time, and the first description information.

In some embodiments, the presenting module 73 combines the set of message events with the set of group sorting events comprises:

for any message event in the set of message events and any group sorting event in the set of group sorting events, in accordance with a determination that the first group identification is the same as the second group identification and the first update time is earlier than the second update time, the presenting module 73 generating a target message event to be the group sorting event, and establishing a correspondence relationship between the group sorting event and the message event.

In some embodiments, the set of target message events comprises at least one group sorting event.

The present module 73 presenting, based on the set of target message events, a corresponding message through the client comprises:

the present module 73 determining, based on the second update time in a group sorting event, sorting of the second group identification in the list, and presenting the sorting through the client; searching, based on the correspondence relationship, for a message event corresponding to the group sorting event in the set of message events, and retrieving a corresponding message from the database based on the first description information in the message event, and presenting, through the client, the message in the group corresponding to the second group identification in the group sorting event.

Technical details of the apparatus for group message processing disclosed in related embodiments of FIG. 7 may refer to the method for group message processing disclosed in the related embodiments of FIG. 4, which will not be repeated here to avoid duplication.

The division of the respective modules in the above apparatuses is only a logical functional division, and there can be other division ways in actual implementations. For example, at least two modules in the apparatus for group message processing can be implemented as one module; each module in the apparatus for group message processing can also be divided into a plurality of sub-modules. It can be understood that each module or sub-module can be implemented by electronic hardware, or a combination of computer software and electronic hardware. Whether these functions are performed in hardware or software depends on the specific application and design constraints of the technical solution. Those skilled in the art can use different methods in each specific application to achieve the described functions.

Figure 8:
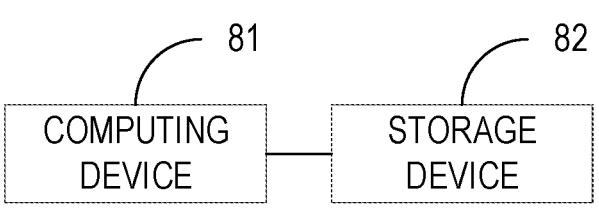
FIG. 8 is an example block diagram of a system comprising at least one computing device and at least one storage device storing instructions provided in embodiments of the present disclosure.

FIG. 8 is an example block diagram of a system provided in embodiments of the present disclosure, which comprises at least one computing device and at least one storage device for storing instructions. In some embodiments, the system may be used for big data processing, and the at least one computing device and the at least one storage device may be distributed deployment, to make the system a distributed data processing cluster.

As shown in FIG. 8, the system comprises at least one computing device 81 and at least one storage device 82 that stores instructions. It can be understood that the storage device 82 in these embodiments can be a volatile memory or non-volatile memory, or can comprise both volatile and non-volatile memory.

In some embodiments, the storage device 82 stores the following elements of executable units or data structures, or any subsets thereof or any extended sets thereof, such as operating systems and applications.

The operating system herein comprises various system programs, such as framework layer, core library layer, driver layer, etc., for implementing various basic tasks and processing hardware-based tasks. The application program comprises various applications, such as media players and browsers, for implementing various application tasks. The program that implements the method for group message processing provided in the embodiments of the present disclosure can be comprised in the application program.

In the embodiments of the present disclosure, the at least one computing device 81 recalls a program or instruction stored in the at least one storage device 82, specifically a program or instruction stored in an application program. The at least one computing device 81 is used to execute the steps of the embodiments of the method for group message processing provided in the embodiments of the present disclosure.

The method for group message processing provided in the embodiments of the present disclosure can be applied at the computing device 81 or implemented by the computing device 81. The computing device 81 can be an integrated circuit chip with signal processing capability. In the implementation process, each step of the above method can be completed by the integrated logic circuit of the hardware or instructions in the form of software in the computing device 81. The computing device 81 can be a general-purpose processor, a Digital Signal Processor (DSP), an Application Specific Integrated Circuit (ASIC), a Field Programmable Gate Array (FPGA) or other programmable logic devices, discrete gate or transistor logic devices, discrete hardware components. The general-purpose processor can be a microprocessor or the processor can also be any conventional processor, etc.

The method for group message processing provided in the embodiments of the present disclosure can be directly embodied as hardware decoding processor execution is completed, or executed by a combination of hardware and software units in the decoding processor. The software unit can be located in a random-access memory, flash memory, read-only memory, programmable read-only memory, or electrically erasable programmable memory, registers, and other mature storage media in the art. The storage medium is in the storage device 82, and the computing device 81 reads the information from the storage device 82 and performs the steps of the method in combination with the hardware completion.

The embodiments of the present disclosure also propose a computer-readable storage medium, where the computer-readable storage medium stores a program or instructions that, when executed by at least one computing device, cause the at least one computing device to perform the steps of the embodiments of the method for group message processing, which will not be repeated herein to avoid repeated description. The computing device herein may be the computing device 81 shown in FIG. 8. In some embodiments, the computer-readable storage medium is a non-transitory computer-readable storage medium.

The embodiments of the present disclosure also propose a computer program product, wherein the computer program product comprises a computer program stored in a non-transitory computer-readable storage medium, and at least one processor of the computer reads the computer program from the storage medium and executes the computer program, causing the computer to perform the steps of the embodiments of the method for group message processing, which will not be repeated herein to avoid repeated description.

Herein, the computer program product may be in any combination of one or more programming languages to write program code for performing the operations of embodiments of the present disclosure, where the programming languages include Object Oriented programming languages, such as Java. C++, etc., and may further include conventional procedural programming languages, such as "C" language or a similar programming language. The program code may be fully executed in a user computing device, partially executed in a user computing device, or may be executed as a stand-alone software package, or may be executed partially in the user computing device and partially in a remote computing device, or may be fully executed in a remote computing device or a server.

It should be noted that, the terms "including", "comprising", or any other variation thereof herein are intended to cover non-exclusive inclusion, so that a process, method, article, or device that comprises a series of elements not only comprises those elements, but also comprises other elements not explicitly listed, or comprises elements inherent to such a process, method, article, or device. Without further restrictions, the elements defined by the phrase "comprising" do not exclude the existence of other identical elements in the process, method, article, or device that comprises the element.

The ordinary skilled in the art can understand that although some of the embodiments described herein comprise certain features comprised in other embodiments rather than other features, the combination of features of different embodiments means that they are within the scope of this disclosure and form different embodiments.

The ordinary skilled in the art can understand that the description of each implementation example has its own emphasis, and the parts that are not described in detail in a certain implementation example can refer to the relevant descriptions of other implementation examples.

Although the embodiments of the present disclosure are described in conjunction with the accompanying drawings, those skilled in the art can make various modifications and variations without departing from the spirit and scope of the present disclosure, and such modifications and variations fall within the scope defined by the appended claims.

We claim:

1. A method for group message processing, the method being applied at a server for creating a corresponding group inbox for a group with a number of members exceeding a predetermined number, the method comprising:

obtaining a message sent to a target group;

detecting whether the target group is a group with a number of members exceeding the predetermined number;

in accordance with a detection that the number of members of the target group does not exceed the predetermined number, generating a message event based on the message; and storing the message into a database and storing the message event to personal inboxes of respective members in the target group.

2. The method of claim 1, wherein the method further comprises:

in accordance with a detection that the number of members of the target group exceeds the predetermined number, generating a message event based on the message; and storing the message into a database and storing the message event into a group inbox of the target group.

3. The method of claim 1, wherein the method further comprises:

obtaining sorting interference from a user for a group with a number of members exceeding the predetermined number, to generate a group sorting event; and storing the group sorting event into a personal inbox of the user.

4. A method for group message processing, the method being applied at a client and comprising:

in response to an operation of activating the client, obtaining a list of groups with a number of members exceeding a predetermined number, a user of the client being comprised in the groups;

obtaining a set of message events from a group inbox corresponding to a group with a number of members exceeding the predetermined number, the set of message events comprising at least one message event;

obtaining a set of group sorting events from a personal inbox of the user, the set of group sorting events being an empty set or comprising at least one group sorting event; and presenting, based on the set of message events and the set of group sorting events, a corresponding message through the client.

5. The method of claim 4, wherein presenting the corresponding message through the client based on the set of message events and the set of group sorting events comprises:

combining the set of message events with the set of group sorting events, to obtain a set of target message events; and presenting, based on the set of target message events, the corresponding message through the client.

6. The method of claim 5, wherein a message event in the set of message events comprises: a first group identification, a first update time, and first description information; and wherein a group sorting event in the set of group sorting events comprises: user identification, a second group identification, a second update time, and second description information.

7. The method of claim 6, wherein combining the set of message events with the set of group sorting events comprises:

for a message event in the set of message events and for a group sorting event in the set of group sorting events, in accordance with a determination that the first group identification is the same as the second group identification, and the first update time is later than or the same as the second update time, generating a target message event, the target message event comprising the user identification, the first group identification, the first update time, and the first description information.

8. The method of claim 6, wherein combining the set of message events with the set of group sorting events comprises:

for a message event in the set of message events and a group sorting event in the set of group sorting events, in accordance with a determination that the first group identification is the same as the second group identification and the first update time is earlier than the second update time, generating a target message event to be the group sorting event, and establishing a correspondence relationship between the group sorting event and the message event.

9. The method of claim 8, wherein the set of target message events comprises at least one of the group sorting events; and wherein presenting, based on the set of target message events, a corresponding message through the client comprises:

determining, based on the second update time in a group sorting event, sorting of the second group identification in the list, and presenting the sorting through the client;

searching, based on the correspondence relationship, for a message event corresponding to the group sorting event in the set of message events, and retrieving a corresponding message from the database based on the first description information in the message event, and presenting, through the client, the message in the group corresponding to the second group identification in the group sorting event.

10. A system comprising at least one computing device and at least one storage device storing instructions, wherein the instructions, when executed by the at least one computing device, cause the at least one computing device to perform acts comprising:

in response to an operation of activating the client, obtaining a list of groups with a number of members exceeding a predetermined number, a user of the client being comprised in the groups;

obtaining a set of message events from a group inbox corresponding to a group with a number of members exceeding the predetermined number, the set of message events comprising at least one message event;

obtaining a set of group sorting events from a personal inbox of the user, the set of group sorting events being an empty set or comprising at least one group sorting event; and presenting, based on the set of message events and the set of group sorting events, a corresponding message through the client.

11. The system of claim 10, wherein presenting the corresponding message through the client based on the set of message events and the set of group sorting events comprises:

combining the set of message events with the set of group sorting events, to obtain a set of target message events; and presenting, based on the set of target message events, the corresponding message through the client.

12. The system of claim 11, wherein a message event in the set of message events comprises: a first group identification, a first update time, and first description information; and wherein a group sorting event in the set of group sorting events comprises: user identification, a second group identification, a second update time, and second description information.

13. The system of claim 12, wherein combining the set of message events with the set of group sorting events comprises:

for a message event in the set of message events and for a group sorting event in the set of group sorting events, in accordance with a determination that the first group identification is the same as the second group identification, and the first update time is later than or the same as the second update time, generating a target message event, the target message event comprising the user identification, the first group identification, the first update time, and the first description information.

14. The system of claim 12, wherein combining the set of message events with the set of group sorting events comprises:

for a message event in the set of message events and a group sorting event in the set of group sorting events, in accordance with a determination that the first group identification is the same as the second group identification and the first update time is earlier than the second update time, generating a target message event to be the group sorting event, and establishing a correspondence relationship between the group sorting event and the message event.

15. The system of claim 14, wherein the set of target message events comprises at least one of the group sorting events.

16. The system of claim 15, wherein presenting, based on the set of target message events, a corresponding message through the client comprises:

determining, based on the second update time in a group sorting event, sorting of the second group identification in the list, and presenting the sorting through the client;

searching, based on the correspondence relationship, for a message event corresponding to the group sorting event in the set of message events, and retrieving a corresponding message from the database based on the first description information in the message event, and presenting, through the client, the message in the group corresponding to the second group identification in the group sorting event.

* * * * *